United States Patent [19]

Iiskola et al.

[11] Patent Number: 5,436,213
[45] Date of Patent: Jul. 25, 1995

[54] PROCATALYST COMPOSITION CONTAINING SUBSTITUTED MALEIC OR FUMARIC ACID ESTERS AS AN ELECTRON DONOR FOR OLEFIN POLYMERIZATION

[75] Inventors: Eero Iiskola, Porvoo; Katriina Mills, Kouvola; Thomas Garoff, Helsinki; Timo Leinonen, Hamari, all of Finland

[73] Assignee: Borealis Holding A/S, Lyngby, Denmark

[21] Appl. No.: 66,098
[22] PCT Filed: Oct. 1, 1992
[86] PCT No.: PCT/FI92/00264
  § 371 Date: Aug. 2, 1993
  § 102(e) Date: Aug. 2, 1993
[87] PCT Pub. No.: WO93/07182
  PCT Pub. Date: Apr. 15, 1993

[30] Foreign Application Priority Data
  Oct. 2, 1991 [FI] Finland ................. 914627

[51] Int. Cl.$^6$ ............................. B01J 31/00
[52] U.S. Cl. .................. 502/115; 502/103; 502/133
[58] Field of Search ............... 502/115, 103, 133

[56] References Cited

FOREIGN PATENT DOCUMENTS 0045977  8/1981  European Pat. Off. .

*Primary Examiner*—Asok Pal
*Attorney, Agent, or Firm*—Birch, Stewart, Kolasch & Birch

[57] ABSTRACT

It is known that an electron donor together with a compound of tetravalent titanium on a magnesium halide carrier is usable if it is a mono- or polyester of an unsaturated polycarboxylic acid in which at least two carboxyl groups are joined to contiguous carbon atoms which form double bonds. It has now been observed that activity and stereospecificity increase if at least one of the said carbon atoms, or a carbon atom joined thereto by a double bond, is substituted by a hydrocarbon group having 1–20 carbon atoms. Maleic and fumaric acid esters substituted with the said hydrocarbon group can be mentioned as examples.

9 Claims, No Drawings

PROCATALYST COMPOSITION CONTAINING SUBSTITUTED MALEIC OR FUMARIC ACID ESTERS AS AN ELECTRON DONOR FOR OLEFIN POLYMERIZATION

FIELD OF THE INVENTION

The invention relates to a procatalyst composition for an α-olefin polymerization catalyst, the composition comprising a magnesium dihalide carrier and thereon a compound of tetravalent titanium and an electron donor, the electron donor being a mono- or polyester of an unsaturated polycarboxylic acid in which at least two carboxyl groups are joined to contiguous carbon atoms which form double bonds.

BACKGROUND OF THE INVENTION

α-olefins are often polymerized using a Ziegler-Natta catalyst system made up of a so-called procatalyst and a cocatalyst. Of these, the procatalyst component is based on a compound of a transition metal belonging to any of Groups IVA–VIII in the Periodic Table of the Elements, and the cocatalyst component is based on an organometallic compound of a metal belonging to any of Groups IA–IIIA in the Periodic Table of the Elements (the groups are defined according to Hubbard, i.e. IUPAC). The catalyst system may also include a carrier on which the transition-metal compound is deposited and an internal electron donor which enhances and modifies the catalytic properties and is deposited on the carrier together with the transition-metal compound. In addition, a separate so-called external electron donor can also be used together with the procatalyst and the cocatalyst.

In the preparation of stereoselective high-yield Ziegler-Natta catalysts on a magnesium dihalide, organic esters are widely used as internal donors to improve the said properties of the catalyst. Publications U.S. Pat. No. 4,522,930, EP-45 977 and FI-70 028 describe an α-olefin polymerization catalyst obtained by causing a cocatalyst, an external donor and a carrier-based procatalyst to react together. The procatalyst is made up of a titanium compound deposited on a magnesium dihalide carrier and of an internal electron donor. The internal donor may be any of the following (summary of the above state of the art):

1) saturated dicarboxylic acid ester,
2) unsaturated polycarboxylic acid ester,
3) aromatic di- or polycarboxylic acid ester,
4) aromatic oligohydroxy compound ester,
5) monocarboxylic acid ester,
6) araliphatic polycarboxylic acid ester,
7) heterocyclic aromatic polycarboxylic acid ester,
8) carbonic acid ester,
9) polyol or monohydroxyphenol ester,
10) acetylenic acid ester.

Regarding group 2) it is stated that the two carboxyl groups may, or may not, be linked to contiguous carbon atoms which form double bonds. As an example of internal electron donors of the former type, publications FI-70 028 and EP-45 977 mention the compounds di-2-ethyl-hexyl maleate, di-isobutyl maleate, di-isobutyl-3,4-furan-dicarboxylate, di-2-ethyl-hexyl fumarate, 2-ethyl-hexyl fumarate, and 2-ethyl-hexyl monomaleate. In addition, the FI publication states that the esters of maleic, pivalic, carbonic, and phthalic acids are especially advantageous internal donors.

According to Table I of the FI and EP publications, the activity of maleates is, however, only about one-half of the activity of phthalates, and thus there is very little use for them in commercial processes. By the same criteria it can be concluded that the di-butyl-itaconate presented in the table of the US publication is not a practicable internal donor, either.

SUMMARY OF THE INVENTION

The object of the present invention is to provide a maximally active procatalyst composition for a polymerization catalyst. The invention at the same time aims at a procatalyst composition which yields a maximally tactic polymer. A further aim is that the polymer produced should have a suitable morphology, bulk density, and melt index.

These objectives have now been achieved with a procatalyst combination for an α-olefin polymerization catalyst, the procatalyst combination being is primarily characterized in what is stated in the characterization clause of claim 1. It has thus been realized that, if the electron donor used is a mono- or polyester of an unsaturated polycarboxylic acid in which at least two carboxyl groups are joined to contiguous carbon atoms forming double bonds, at least one of the said carbon atoms of the electron donor, or a carbon atom joined thereto by a double bond, is to be substituted by a hydrocarbon group having 1–20 carbon atoms.

The invention is thus based on the surprising observation that hydrocarbon groups in the vicinity of the carboxyl groups and double bonds in unsaturated polycarboxylic acids have a greatly increasing effect on catalyst activity.

DETAILED DESCRIPTION OF THE INVENTION

The procatalyst composition according to the invention comprises a magnesium dihalide carrier and thereon a compound of tetravalent titanium and an electron donor. The magnesium dihalide carrier is preferably magnesium dichloride. The tetravalent titanium compound may be a titanium alkoxide, a titanium alkoxide halide, or a titanium halide. Preferably it is titanium tetrachloride.

According to one preferred embodiment, the magnesium dihalide carrier and the compound of tetravalent titanium and the electron donor thereon are prepared by melting magnesium dichloride together with a lower alcohol, such as ethanol, and possibly an internal donor, to produce a molten homogeneous mixture, which is then formed by physical means into small active particles of carrier material. Substantially spherical carrier particles can, for example, be prepared by spray-crystallizing the said melt in accordance with U.S. Pat. No. 4,829,034.

Thereafter the carrier particles are activated by contacting them with a compound of tetravalent titanium and possibly at this stage also with an internal donor. Often a repeat treatment with the compound of tetravalent titanium is carried out in order to produce a maximally active procatalyst.

As stated above, in the electron donor at least one of the carbon atoms forming double bonds or joined thereto by a double bond is substituted by a hydrocarbon group having 1–20 carbon atoms. In this case it is advantageous if the electron donor is a maleic or fumaric acid ester substituted with the said hydrocarbon group. According to one preferred embodiment, the electron donor is a maleic acid diester monosubstituted with the said hydrocarbon group. In this case it is most preferable that it is dialkyl cis-2-methyl-butenedioic acid ester with 1–10 carbon atoms in its alkyl. Some such compounds are:

DEMB = diethyl cis-2-methyl-butenedioic acid ester,
DIBMB = di-isobutyl cis-2-methyl-butenedioic acid ester,
DDMB = didecyl cis-2-methyl-butenedioic acid ester.

It has been observed that a procatalyst composition according to the invention works very well if its electron donor/magnesium molar ratio is within a range of approx. 0.050–0.50. Its Al/Ti molar ratio is preferably within a range of approx. 500–1000, and its Al/electron donor molar ratio is preferably within a range of approx. 10–30. The preparation of catalysts according to the invention and their use for the polymerization of propylene are described in the following examples. The steps of catalyst preparation are identical in all the examples, unless otherwise indicated. There are 6 embodiment examples and 4 comparison examples, namely BCDE. The purpose of the comparison examples is to make a comparison between nonsubstituted unsaturated diesters, such as dialkyl maleates, and substituted unsaturated diesters according to the present invention.

The following abbreviations are used in the examples and the tables:

DEMB = diethyl cis-2-methyl-butenedioic acid ester,
DIBMB = di-isobutyl cis-2-methyl-butenedioic acid ester,
DDMB = didecyl cis-2-methyl-butenedioic acid ester,
DEME = diethyl maleate,
DIBME = di-isobutyl maleate,
DDME = didecyl maleate.

EXAMPLE 1

Activation of a $MgCl_2 \cdot 3EtOH$ carrier was performed as follows:

24.5 g of the above-mentioned carrier, prepared in accordance with U.S. Pat. No. 4,829,034, is added at $-10°$ C. into a vessel containing 150 ml of heptane and 300 ml of $TiCl_4$. The carrier is allowed to react while the temperature is raised slowly to $+20°$ C., with mixing. At this temperature, 1.9 ml of DIBMB is added, i.e. the DIBMB/Mg molar ratio is 0.075, and the temperature is raised within 60 minutes to $+110°$ C. and is maintained at that level for 60 minutes. The treatment is repeated with 300 ml of $TiCl_4$ at $+120°$ C. for 60 minutes. The product is washed with 300 ml of heptane at 80° C. for 20 minutes. The washing is repeated five times, and the product thus obtained is dried in a nitrogen stream at room temperature.

The dried procatalyst was brown, and the following analytical results were obtained regarding it:

Ti 3.1% by weight; Mg 16.7% by weight; Cl 58.0% by weight; DIBMB 9.7% by weight; heptane 12.5% by weight.

The polymerization was carried out in a two-liter autoclave by using 900 ml of heptane as the medium:

$P(C_3H_6) = 7$ bar
$AlEt_3$, 5 mmol; Al/Ti = 737
$P(H_2) = 0.3$ bar
Al/electron donor = 20
$T = +70°$ C.
Catalyst quantity = 25.0 mg
t = 4 h Triethyl aluminum was used as the cocatalyst and cyclohexyl-methyl-dimethoxysilane was used as the electron donor. The activity of the catalyst was 529 kg polypropylene per g Ti and 18.7 kg PP/g dry catalyst.

The evaporation residue obtained from the polymerization fluid was 0.7% by weight, calculated from the total polypropylene quantity. The isotacticity of the polypropylene was 97.2%, its isotactic index 96.5%, and its relative density 0.47 $g/cm^3$. The melt index of the polymer was 6.2 g/10 min (see Tables 1 and 2).

EXAMPLES 2–4

The preparation of the catalyst was performed exactly as in Example 1 by using the carrier mentioned above, but the DIBMB/Mg molar ratios were 0.125, 0.175 and 0.350 (in examples 2, 3 and 4, respectively). The analytical results of the catalysts are shown in Table 1.

Propylene polymerization was performed as in Example 1 (25.0 mg of procatalyst, 5 mmol of $AlEt_3$ and an Al/electron donor molar ratio of 20 were used). The results of the polymerization are shown in Table 2.

EXAMPLE 5

The preparation of the catalyst was performed exactly as in Example 1 by using the carrier mentioned above, but DEMB was used instead of DIBMB as the internal donor. The DEMB/Mg molar ratio in the procatalyst synthesis was 0.075. The analytical results of the procatalysts obtained are shown in Table 1.

Propylene polymerization was performed as in Example 1 (25.0 mg of catalyst, 5 mmol of $AlEt_3$, and Al/electron donor molar ratio 20). The polymerization results are shown in Table 2.

EXAMPLE 6

The preparation of the catalyst was performed exactly as in Example 1 by using the carrier mentioned above, but DDMB instead of DIBMB was used as the electron donor. The DDMB/Mg molar ratio in the procatalyst synthesis was 0.104. The analytical results of the procatalysts are shown in Table 1.

Propylene polymerization was performed as in Example 1 (25.0 mg of procatalyst, 5 mmol of $AlEt_3$, and Al/electron donor molar ratio 20). The polymerization results are shown in Table 2.

COMPARISON EXAMPLE A

The preparation of catalyst was performed exactly as in Example 1, by using the same carrier, but no electron donor was used. The analytical results were: Ti 7.2% by weight; Mg 14.2% by weight; Cl 57.2% by weight; heptane 21.4% by weight.

Propylene polymerization was performed as in Example 1. The activity of the catalyst was 149 kg polypropylene per g Ti. The evaporation residue from the polymerizing fluid was 15.3% by weight, calculated from the total polypropylene quantity obtained. The isotacticity of the polypropylene was 91.7% and its isotactic index 77.7%. Specific density was not measured, since the polypropylene was sticky owing to amorphousness. The melt index of the polymer was 3.0 g/10 min.

COMPARISON EXAMPLES B, C, D AND E

The preparation of the catalyst was performed exactly as in Example 1, by using the same carrier, but di-isobutyl maleate (DIBME) instead of DIBMB was used as the internal donor. The DIBME/Mg molar ratios were 0.075, 0.125, 0.175, and 0.350. The analytical results of the procatalysts obtained are shown in Table 1. Propene polymerization was performed as in Example 1, and the polymerization results are shown in Table 3.

TABLE 1

Type and quantity of the donor used in synthesis, and analytical compositions of the catalysts (in % by weight)

| Example | Donor/Mg molar ratio | Donor/ml added | Ti | Mg | Cl | Donor |
|---------|---------------------|----------------|-----|------|------|-------|
| 1 | 0.075 | DIBMB 1.9 | 3.1 | 16.7 | 58.2 | 9.7 |
| 2 | 0.125 | DIBMB 3.2 | 2.4 | 18.5 | 61.2 | 7.5 |
| 3 | 0.175 | DIBMB 4.5 | 2.2 | 15.9 | 53.0 | 9.1 |
| 4 | 0.35 | DIBMB 8.9 | 5.7 | 15.1 | 61.0 | 23.0 |
| 5 | 0.075 | DEMB 1.5 | 1.7 | 15.9 | 51.5 | 10.7 |
| 6 | 0.104 | DDMB 4.4 | 3.1 | 16.8 | 58.3 | 13.8 |
| Comp. B | 0.0750 | DIBME 1.8 | 2.2 | 12.9 | 56.2 | 5.4 |
| Comp. C | 0.125 | DIBME 3.1 | 2.5 | 16.7 | 56.2 | 8.3 |
| Comp. D | 0.175 | DIBME 4.4 | 2.5 | 17.8 | 59.4 | 9.6 |
| Comp. E | 0.35 | DIBME 8.8 | 5.7 | 11.9 | 51.7 | 21.5 |

TABLE 2

Performance of the catalysts in propylene polymerization carried out in a heptane slurry by using internal donors in accordance with the invention

| Example | Activity in kg PP/g Ti | Activity in kg PP/g of dry catalyst | Isotacticity/ evaporation residue | I.I. (%) | B.D. | M.I. |
|---------|------|------|-----------|------|------|------|
| 1 | 529 | 18.7 | 97.2/0.7 | 96.5 | 0.47 | 6.2 |
| 2 | 592 | 16.1 | 98.2/0.7 | 97.5 | 0.39 | 8.5 |
| 3 | 595 | 16.3 | 98.3/0.6 | 97.7 | 0.37 | 12.5 |
| 4 | 204 | 11.6 | 98.7/0.7 | 98.0 | 0.41 | 12.0 |
| 5 | 876 | 18.7 | 98.6/1.1 | 97.5 | 0.39 | 2.2 |
| 6 | 574 | 19.5 | 95.8/0.9 | 94.9 | 0.43 | 6.3 |

TABLE 3

Performance of procatalysts in propylene polymerization carried out in a heptane slurry using as the internal donor DIBME, a compound in accordance with the state of the art

| Example | Activity in kg PP/g Ti | Activity in kg PP/g of dry catalyst | Isotacticity/ evaporation residue | I.I. (%) | B.D. | M.I. |
|---------|------|------|-----------|------|------|------|
| Comp. B | 559 | 12.3 | 97.1/1.3 | 95.8 | 0.45 | 8.0 |
| Comp. C | 372 | 9.3 | 97.1/1.1 | 96.0 | 0.40 | 14.4 |
| Comp. D | 147 | 6.0 | 97.7/1.4 | 96.3 | 0.39 | 14.1 |
| Comp. E | 37 | 1.6 | 96.8/7.0 | 89.8 | 0.31 | 13.0 |

We claim:

1. A procatalyst composition for an α-olefin polymerization catalyst, the procatalyst composition comprising a magnesium dihalide carrier and, thereon, a compound of tetravalent titanium and an electron donor, the electron donor being selected from the group consisting of diethyl cis-2-methyl-butenedioic acid ester, diisobutyl cis-2-methyl butenedioic acid ester and didecyl cis-2-methyl-butenedioic acid ester.

2. A procatalyst composition according to claim 1, characterized in that the magnesium dihalide carrier is magnesium dichloride.

3. A procatalyst composition according to claim 2, characterized in that the magnesium dichloride carrier is prepared by melting dry magnesium chloride and ethanol together, by forming from the melt small drops, and by solidifying the melt drops by cooling, preferably by spray crystallization, to form solid carrier particles.

4. A procatalyst composition according to claim 1, 2 or 3, characterized in that the compound of tetravalent titanium is titanium tetrachloride.

5. A procatalyst composition according to claim 1, 2 or 3, characterized in that its electron donor/magnesium molar ratio is within a range of approx. 0.01–0.50.

6. A procatalyst composition according to claim 1, 2 or 3, characterized in that the polymerization catalyst in which it is a component also comprises an organometallic aluminum compound as a cocatalyst and, electively, an external donor.

7. A procatalyst composition according to claim 6, characterized in that the organometallic aluminum compound is trialkyl aluminum, preferably triethyl aluminum, and the external donor is dimethyl-dialkoxysilane, preferably cyclohexyl-methyl-dimethoxysilane.

8. A procatalyst composition according to claim 6, characterized in that the Al/Ti molar ratio is within a range of approx. 1–1000, preferably approx. 500–1000.

9. A procatalyst composition according to claim 6, characterized in that the Al/electron donor molar ratio is within a range of approx. 0.1–200, preferably within a range of approx. 10–30.

* * * * *